(12) United States Patent
Ser

(10) Patent No.: US 11,026,313 B1
(45) Date of Patent: Jun. 1, 2021

(54) ILLUMINATION SYSTEM

(71) Applicant: DeeDiim Sensors Inc., Hanam-si (KR)

(72) Inventor: Jang-Il Ser, Chuncheon-si (KR)

(73) Assignee: DEEDIIM SENSOR INC., Hanam-si (KR)

( * ) Notice: Subject to any disclaimer, the term of this patent is extended or adjusted under 35 U.S.C. 154(b) by 0 days.

(21) Appl. No.: 16/995,277

(22) Filed: Aug. 17, 2020

(51) Int. Cl.
*H05B 47/105* (2020.01)
*F21V 23/00* (2015.01)
*G01N 21/01* (2006.01)
*F21Y 115/10* (2016.01)

(52) U.S. Cl.
CPC ......... *H05B 47/105* (2020.01); *F21V 23/003* (2013.01); *G01N 21/01* (2013.01); *F21V 2200/20* (2015.01); *F21Y 2115/10* (2016.08); *G01N 2201/062* (2013.01)

(58) Field of Classification Search
CPC . H05B 47/105; F21V 23/003; F21V 2200/20; G01N 21/01; G01N 2201/062; F21Y 2115/10
See application file for complete search history.

(56) References Cited

U.S. PATENT DOCUMENTS

| | | | | |
|---|---|---|---|---|
| 4,677,473 A * | 6/1987 | Okamoto | ......... | G01N 21/95684 228/105 |
| 6,023,663 A * | 2/2000 | Kim | ...................... | G06T 7/0004 702/81 |
| 6,207,946 B1 * | 3/2001 | Jusoh | ................. | G01N 21/8806 250/208.1 |
| 6,273,338 B1 * | 8/2001 | White | ................ | G01N 21/8806 235/455 |
| 6,542,236 B1 * | 4/2003 | Kim | .................... | G01N 21/8806 356/394 |
| 7,276,719 B2 * | 10/2007 | Schwarz | ................... | G01J 3/50 250/223 R |
| 7,394,084 B2 * | 7/2008 | Kuriyama | .......... | G01N 21/8806 250/559.34 |
| 7,667,856 B2 * | 2/2010 | Fukamizu | .............. | G01N 21/57 356/614 |
| 8,605,284 B2 * | 12/2013 | Toriumi | ............... | G01N 21/474 356/446 |
| 9,772,230 B2 * | 9/2017 | Ehbets | ................. | G01N 21/255 |
| 2004/0165189 A1 * | 8/2004 | Castonguay | ......... | G01N 21/474 356/446 |

(Continued)

*Primary Examiner* — Raymond R Chai
(74) *Attorney, Agent, or Firm* — Kile Park Reed & Houtteman PLLC

(57) ABSTRACT

An illumination system includes a measurement stage, a light-providing part, a light-receiving part, and a processing part. The light-providing part includes light sources arranged in a dome shape, which irradiate incident lights to a measurement target on the measurement stage. The light-receiving part acquires reflection lights. The processing part controls the light sources to be turned on/off according to a dome-shaped sine wave pattern. The processing part controls the light sources to be sequentially turned on/off by shifting N times according to the dome-shaped sine wave pattern for a specific measurement position of the measurement target, and calculates a phase at the specific measurement position, an average of intensities of N reflection lights, and a visibility of N reflection lights, from intensities of N reflection lights. Thus, material of the measurement target may be easily determined.

12 Claims, 6 Drawing Sheets

(56) References Cited

U.S. PATENT DOCUMENTS

2005/0156103 A1\* 7/2005 May .................. F21K 9/60
250/228
2007/0146709 A1\* 6/2007 He .................. G01J 3/50
356/402

\* cited by examiner

ILLUMINATION SYSTEM

BACKGROUND OF THE INVENTION

Field of the Invention

Exemplary embodiments of the present invention relate to an illumination system.

More particularly, exemplary embodiments of the present invention relate to an illumination system that enables material determination of an object.

Discussion of the Background

Generally, various methods of recognizing material of an object have been studied.

These methods typically employ a method of recognizing material of an object through an internal structure of the object, such as a method of analyzing material of the object by irradiating the object with an incident wave and measuring a reflected wave coming back.

However, since this method needs to grasp the internal structure of the object, this method complicates a system for material determination, greatly increases the manufacturing cost thereof. In addition, this method is not only difficult to determine material, but there is a limit to the determination of materials for various objects, and there is a problem that it is difficult to secure reliability.

Therefore, it is required to develop an illumination system for recognizing material and a method of recognizing material capable of easily and accurately recognize material of an object at a low cost.

SUMMARY OF THE INVENTION

Exemplary embodiments of the present invention provide an illumination system suitable for easily and accurately recognizing material of an object at a low cost.

Additional features of the invention will be set forth in the description which follows, and in part will be apparent from the description, or may be learned by practice of the invention.

In an exemplary embodiment of the present invention, an illumination system includes a measurement stage, a light-providing part, a light-receiving part, and a processing part. A measurement target is located on the measurement stage. The light-providing part includes a plurality of light sources irradiating incident lights to the measurement target. The plurality of light sources are arranged to surround a top of the measurement target in a dome shape so that the incident lights from multiple directions with respect to the measurement target are selectively illuminated toward the measurement target. The light-receiving part acquires reflection lights by the measurement target according to the incident lights irradiated by the light-providing part. The processing part controls the light sources to be turned on/off according to a dome-shaped sine wave pattern. The processing part controls the light sources to be sequentially turned on/off by shifting N times according to the dome-shaped sine wave pattern for a specific measurement position of the measurement target (herein, N is a natural number of 2 or more). The light-providing part generates N pattern lights that are sequentially turned on/off and irradiates the N pattern lights toward the measurement target. The light-receiving part receives N reflection lights of the N pattern lights irradiated to the measurement target. The processing part calculates a phase at the specific measurement position of the measurement target, an average of the intensities of the N reflection lights, and a visibility of the N reflection lights, from the intensities of the N reflection lights.

In one embodiment, the processing part may generate image data for a measurement area based on the calculated phase, average and visibility.

In one embodiment, the image data may include a slope image representing a slope for each pixel of the measurement target on a gray scale based on the calculated phase, a reflectance image representing a reflectance for each pixel of the measurement target on a gray scale based on the calculated average, and a roughness image representing a roughness for each pixel of the measurement target by a gray scale based on the calculated visibility.

In one embodiment, the processing part may determine material of the measurement target from the calculated phase, average and visibility.

In one embodiment, each of the light sources of the light-providing part may include a light-emitting diode (LED).

In one embodiment, the light-providing part may further include an illumination cover disposed over the measurement target to cover surrounding of the measurement target, and light-emitting diodes of the light sources may be installed on the illumination cover.

In one embodiment, the illumination cover may have a shape including at least a portion of a dome, and the light-emitting diodes are provided in a ring shape having different diameters when viewed from a bottom direction to form a plurality of rows within a shape including at least a portion of the dome.

In one embodiment, the illumination cover may have an opening formed corresponding to an upper portion of the measurement target. The light-receiving part may be arranged to receive reflection lights reflected from the measurement target through the opening.

In one embodiment, the light-providing part may include a first light-providing part that provides incident light to the measurement target from the light-emitting diodes mounted on the illumination cover, and a second light-providing part that provides incident light to the measurement target through the opening formed through the illumination cover.

In one embodiment, the plurality of light sources may be arranged at (r, θ, φ) coordinates on a spherical coordinate system centering on the measurement position of the measurement target.

For example, the dome-shaped sine wave pattern may be formed such that a sine wave is formed on a hemisphere as a θ-coordinate changes from 0 to 360 degrees at a specific φ-coordinate within a range of 0 to 90 degrees and a constant r-coordinate.

For example, the dome-shaped sine wave pattern may be formed such that a sine wave is formed on a hemisphere as a φ-coordinate changes from 0 to 90 degrees at a specific θ-coordinate within a range of 0 to 360 degrees and a constant r-coordinate.

For example, the dome-shaped sine wave pattern may be formed such that a sine wave is formed on a hemisphere as a θ-coordinate changes from 0 to 180 degrees at a specific φ-coordinate within a range of −90 to 90 degrees and a constant r-coordinate.

According to the present invention, incident lights are irradiated from multiple directions to the measurement target using a plurality of light sources and controlled to be turned on/off according to a dome-shaped sine wave pattern formed on a dome, to thereby calculate a phase at the specific measurement position of the measurement target, an average of the intensities of reflection lights, and a visibility of reflection lights, so that the material of the measurement target may be easily determined.

In addition, unlike a conventional planar sine wave pattern, since the dome-shaped sine wave pattern is formed on a dome-shaped hemisphere, in case of the phase, the average, and the visibility, not only a measurement value at any one measurement position is very accurate, but also an absolute measurement value at each measurement position is very accurate, so the relationship between the measurement positions may also have a very accurate value.

Accordingly, when the phase, the average, and the visibility calculated as described above are represented or processed as an image for material determination, users may easily utilize the image for material determination.

In addition, even if the intensity distribution of the reflection lights is not necessarily obtained for the material determination, the material determination may be possible based only on the information of the phase, the average, and the visibility.

Also, surface condition determination of an object may be available by the illumination system, and the illumination system may be utilized for defect determination of an object, in addition to the material determination as described above.

In addition, the phase, the average, and the visibility calculated as described above, when setting various criteria for material determination, surface condition determination, defect determination, etc. in advance, the processing part may perform material determination, surface condition determination, and defect determination. Thus, users' convenience and reliability may be improved.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
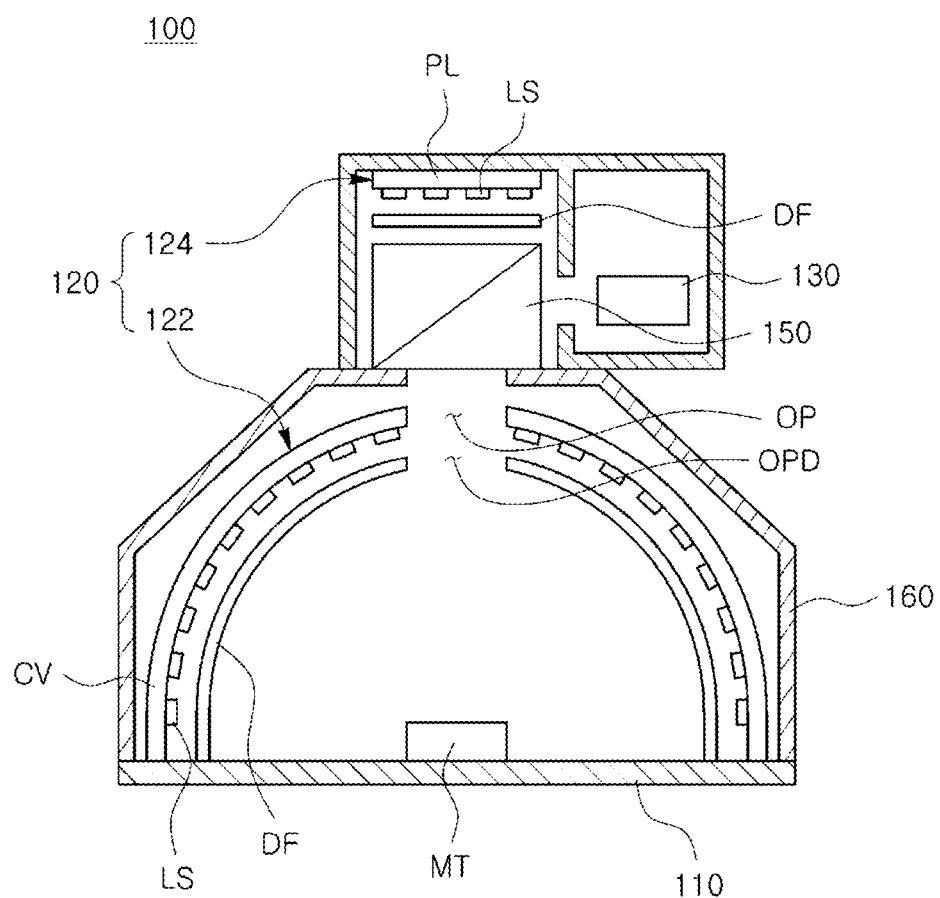
FIG. 1 is a conceptual view illustrating an illumination system according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be illustrated as being implemented in a suitable computing environment. In addition, various methods according to the present invention may be provided as a recording medium that records a computer-software for implementing the methods.

The recording medium typically includes a variety of computer readable media, and may be provided as any available media that can be accessed by a computer. Further, the recording medium includes volatile or non-volatile media, removable or non-removable media, etc. For example, the recording medium may include all the media implemented in any method or technology for storage of information such as computer readable instructions, data structures, program modules or other data. In addition, the recording medium includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

Hereinafter, exemplary embodiments of the present invention will be described in detail with reference to the accompanying drawings.

Figure 2:
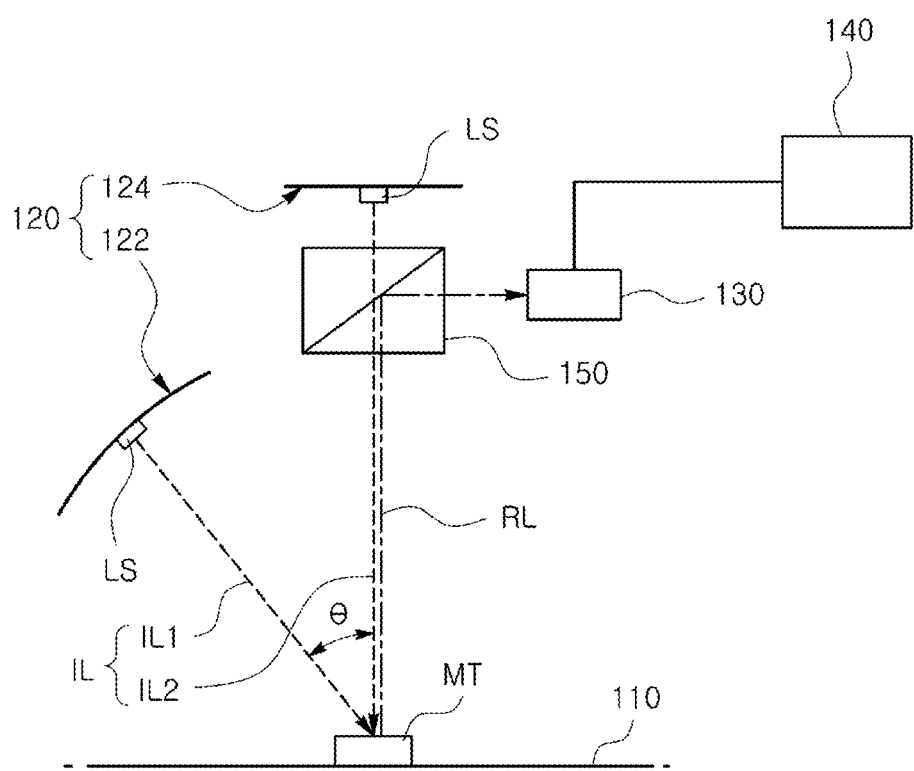
FIG. 2 is a conceptual view illustrating an operation of the illumination system shown in FIG. 1.

FIG. 1 is a conceptual view illustrating an illumination system according to an exemplary embodiment of the present invention. FIG. 2 is a conceptual view illustrating an operation of the illumination system shown in FIG. 1.

Referring to FIGS. 1 and 2, an illumination system 100 according to an exemplary embodiment of the present invention includes a measurement stage 110, a light-providing part 120, a light-receiving part 130 and a processing part 140.

A measurement target MT is located on the measurement stage 110. The measurement stage 110 may be opened upward. In FIG. 1, although the measurement stage 110 is fixed, the position, posture, etc. of the measurement target MT may be controlled by the processing part 140, which is described later, or a control unit externally provided.

The light-providing part 120 includes a plurality of light sources LS irradiating incident lights IL to the measurement target MT. The plurality of light sources LS of the light-providing part 120 are arranged to surround an upper portion of the measurement target MT in a dome shape so that the incident lights IL from multiple directions with respect to the measurement target MT are selectively illuminated toward the measurement target MT. Meanwhile, the light sources LS may be connected to each other in series, and individually controlled to be turned on/off.

The incident direction of the incident lights IL may be represented by an inclination angle $\theta$ inclined with respect to the normal direction to the measurement target MT. For example, the incident lights IL may be incident in all upward directions, and the incident lights IL may represent an incident direction with an incidence angle $\theta$ between 0° and 90° inclination angle.

For example, the light sources LS of the light-providing part 120 may each include a light-emitting diode (LED). Alternatively, the light sources LS of the light-providing part 120 may include other types of light emitting units.

In one embodiment, the light-providing part 120 may further include an illumination cover CV. The illumination cover CV is disposed over the measurement target MT to cover the periphery of the measurement target MT, and the light-emitting diodes are installed on the illumination cover CV.

For example, the light-emitting diodes may include at least one of red, green, and blue light-emitting diodes, and may be a white light-emitting diode. In addition, the light-emitting diodes may be provided with light-emitting diodes of different colors alternately installed on the illumination cover CV, or light-emitting diodes having their own color changed. Further, the light-emitting diodes may have a fixed brightness or may have a changeable brightness.

Figure 3:
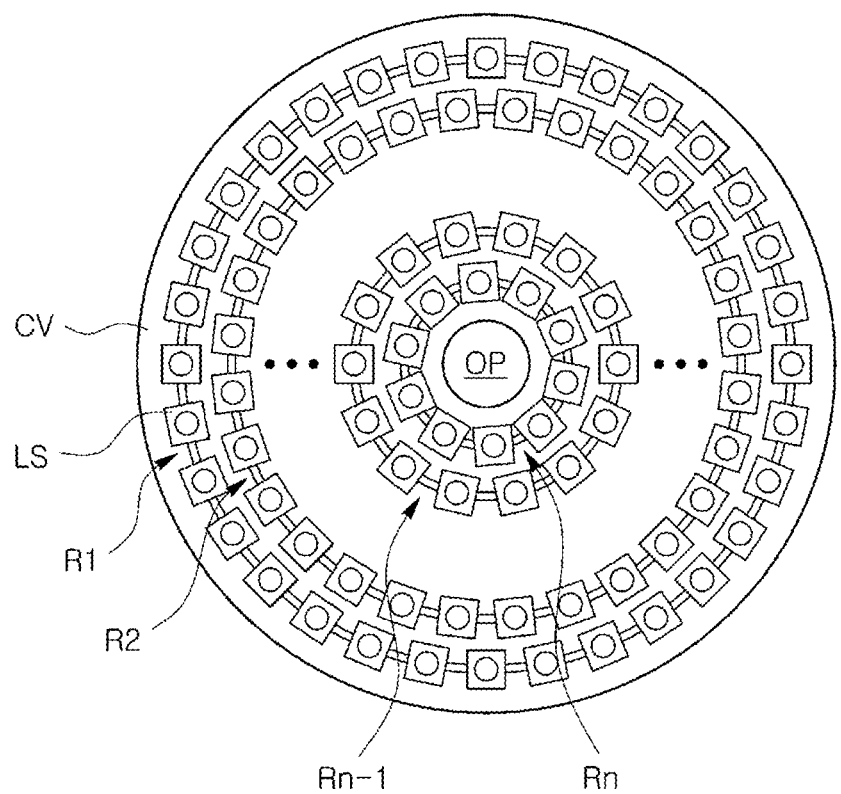
FIG. 3 is a plan view in which an illumination cover of the illumination system shown in FIG. 1 is downwardly viewed.

FIG. 3 is a plan view in which an illumination cover of the illumination system shown in FIG. 1 is downwardly viewed.

Referring to FIG. 3, in one embodiment, the light-emitting diodes may be formed in a strip type physically and electrically connected to each other. That is, the strip-typed light-emitting diodes, as shown in FIG. 3, may be connected to each other in a strip. Meanwhile, the number of light-emitting diodes illustrated in FIG. 3 is illustrated as an example, and may be more or less than the illustrated number. The same applies to the cases of FIGS. 4 to 12 that will be described later.

For example, the illumination cover CV may have a shape including at least a portion of a dome, and the strip-typed light-emitting diodes may be provided in a ring shape different diameters when viewed from the bottom direction, as shown in FIG. 3 to form a plurality of rows (R1, R2, . . . , Rn−1, Rn) within a shape including at least a portion of the dome. That is, in the strip-typed light-emitting diodes, a plurality of rings having different diameters may be arranged in sequence to form a row.

The plurality of light-emitting diodes arranged as described above may be connected in series. However, in this case, when controlling the lighting of the light-emitting diodes, a time delay may occur and may not be controlled as desired, so the light-emitting diodes may be grouped into a predetermined number of groups.

For example, a plurality of light-emitting diodes installed on the illumination cover CV may adjust the connection state according to the number and/or arrangement of light-emitting diodes. That is, the plurality of light-emitting diodes may be grouped into a plurality of channels based on a predetermined number, or may be grouped into a plurality of channels based on the arranged rows, and may also be grouped into a plurality of channels considering both the number and the arranged rows.

For example, the light-emitting diodes forming each ring may be connected to each other within the same row. However, in the case of a row or rows close to an opening OP described later (for example, R1), light-emitting diodes in different rows (for example, R1 and R2) may also be connected to each other, since there are less light-emitting diodes in the row(s) close to the opening OP. Thus, the light-emitting diodes may be grouped for each channel or for the same or similar number. In this case, if necessary, it is also possible not to connect to each other even in the same row. In the processing part 140, which will be described later, the light-emitting diodes divided into a plurality of channels may be divided for each channel to independently control lighting thereof.

Meanwhile, in order to dissipate heat generated from the light-emitting diodes, the illumination cover CV may be formed of metallic, for example, aluminum. In addition, the light-emitting diodes are firmly installed on the illumination cover CV with discharging heat by attaching the connection line between the light-emitting diodes and the illumination cover CV using an electro-thermal bond or a thermal bond.

In one embodiment, the illumination cover CV, may have an opening OP formed corresponding to the upper portion of the measurement target MT. The opening OP may be utilized as an open passage to receive the reflection lights RL in the light-receiving part 130 described later. In addition, the opening OP may be used as a passage for irradiating incident lights toward the measurement target MT in an additional light (second light-providing part) described later.

In one embodiment, the light-providing part 120 may include a first light-providing part 122 and a second light-providing part 124.

The first light-providing part 122 provides an incident light IL1 to the measurement target MT from the light-emitting diodes mounted on the illumination cover CV.

The second light-providing part 124 provides an incident light IL2 to the measurement target MT through the opening OP formed in the illumination cover CV.

As shown in FIG. 1, both the first light-providing part 122 and the second light-providing part 124 provide light generated from the light sources LS described above to the measurement target MT. The first light-providing part 122 may be mounted on the illumination cover CV, and the second light-providing part 124 may be mounted on a plate PL, for example.

In one embodiment, the illumination system 100 may further include a beam splitting part 150.

For example, as shown in FIGS. 1 and 2, the second light-providing part 124 may be disposed above the opening OP, and the light-receiving part 130 may be disposed at a side of the opening OP.

In this case, the beam splitting part 150 transmits the incident light IL2 generated in the second light-providing part 124 to the measurement target MT, and the reflection lights RL by the measurement target MT are reflected to the light-receiving part 130.

Accordingly, the reflection light reflected in substantially the same optical axis direction as the optical axis of the second light-providing part 124 may be effectively received by the light-receiving part 130.

Meanwhile, unlike the arrangements illustrated in FIGS. 1 and 2, the second light-providing part 124 may be disposed at a side of the opening OP, and the light-receiving part 130 may be disposed over the opening OP.

Since the incident light IL2 provided from the second light-providing part 124 passes through the beam splitting part 150, light loss of the incident light IL2 may occur compared with the incident light IL1 provided from the first light-providing part 122. In addition, since the light sources of the second light-providing part 124 are located farther from the measurement target MT than the light sources of the first light-providing part 122, in the light amount reaching the measurement target MT, the second light-providing part 124 may be less than the first light-providing part 122.

Thus, for example, the arrangement density of the light sources of the second light-providing part 124 may be greater than the arrangement density of the light sources of the first light-providing part 122, so that the amount of light loss may be compensated.

In one embodiment, the light-providing part 120 may include a diffuser DF.

The diffuser DF is disposed in front of the light sources LS and diffuses light generated from the light sources LS. In addition, the diffuser (diffuser) (DF) has a shape corresponding to the illumination cover (CV). Accordingly, the diffuser DF may have an opening OPD in the same manner as the opening OP of the illumination cover CV.

The diffuser DF may be disposed in front of the light sources LS of the first light-providing part 122 and in front of the light sources LS of the second light-providing part 124, respectively.

The light-receiving part 130 acquires reflection lights RL by the measurement target MT according to the incident lights irradiated by the light-providing part 120.

As described above, the light-receiving part 130 may be arranged to receive the reflection lights RL reflected from the measurement target MT through the opening OP, and the reflection lights RL may be received through the beam splitting part 150.

The light-receiving part 130 may be installed such that the light receiving angle is adjustable to analyze various signal patterns according to a desired method. In addition, the light-receiving part 130 is the installation tolerance considering the diversity of an installation error of the beam splitting part 150, a forming error of an opening OPD formed through the diffuser (DF), the size or resolution of the light-receiving part 130, etc.

In one embodiment, the light-receiving part 130 may include an optical sensor capable of measuring the intensity of the reflection light RL by the measurement target MT of the incident light, and may include a camera such as a CCD or a CMOS camera. In addition, the light-receiving part 130 may include a lens disposed in front of the optical sensor or the camera.

The processing part 140 controls the light sources LS to be turned on/off according to a dome-shaped sine wave pattern, and generates image data from the reflection lights RL obtained from the light-receiving part 130.

In the present specification, the dome-shaped sine wave pattern is defined as a sine wave pattern formed on a curved surface formed by a dome. The dome-shaped sine wave pattern is formed in a curved shape, unlike a sine wave pattern mainly used in the field of optical measurement and inspection, which is formed in a planar shape. The conventional sine wave pattern has a grating pattern in which the sine wave expands and extends as it is in the y-axis while forming a sine wave in the x-axis when viewed on a plane Cartesian coordinate system. On the other hand, the dome-shaped sine wave pattern may be referred to as a concept in which the above-described grating pattern is applied along a domed curved surface (for example, a hemispherical surface). Specific examples of the dome-shaped sine wave pattern will be described later.

The processing part 140 may control the light sources LS in a serial communication method. The processing part 140 may perform user input and control through a control device, such as a computer, provided externally.

As described above, the light sources LS may be formed of a plurality of channels connected in series with each other, and the processing part 140 may control lighting of the light sources LS for each channel connected in series with each other. That is, since the connection structures for transmitting data in the light sources LS are formed in series, the light sources LS may be individually controlled by a serial communication method.

The light sources LS, for example, a plurality of light-emitting diodes, may be divided into and controlled by a plurality of sections for partial or area control when using a parallel communication method. However, in order to implement more various types of free lighting, it is necessary to set the size of the sections small and connect the sections to control devices as many as the number of the sections, and thus a plurality of wirings are required. In order to adjust the brightness of each section, rapid control with a relatively high current is required. Accordingly, the structures of the illumination device and the control device thereof may be complicated and the manufacturing cost may be increased, and it may be difficult to implement various types of lighting since the degree of freedom of control is low in terms of control for each section.

However, in the case of a serial communication method such as the light-providing part 120, since the light sources LS may be individually controlled by having a serially formed connection structure for data transmission, a form of lighting may be freely implemented. In order to implement such a serial communication method, a circuit that enables serial communication such as a latch may be provided, and a control circuit such as a pulse width modulation (PWM), a DA converter, etc., which is capable of adjusting the brightness of the light sources LS, may be provided.

Meanwhile, as described above, when the plurality of light sources LS are all connected in series, lighting and brightness of each light source LS may need to be collectively controlled, and accordingly, time delay may occur. Thus, the light sources LS may be grouped into a predetermined number of groups or channels, and each channel may be controlled in parallel to prevent time delay.

Since the light-providing part 120 has a structure capable of irradiating light in almost all directions based on the measurement target MT, the processing part 140 may control the light sources LS to be turned on/off in accordance with various types of dome-shaped sine wave patterns.

For example, the dome-shaped sine wave pattern may have various wavelengths and amplitudes on a curved surface formed by the dome, and may include a pattern in which at least two dome-shaped sine wave patterns are synthesized. In addition, the dome-shaped sine wave pattern may be controlled in intensity and lighting in various ways according to the arrangement position of the plurality of light sources arranged in the dome shape.

Figure 4:
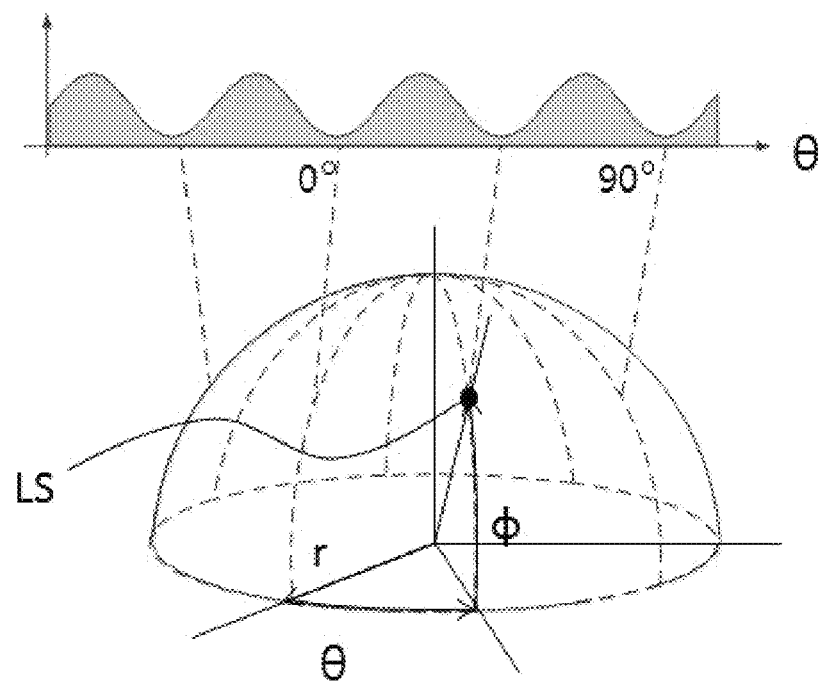
FIG. 4 is a conceptual view illustrating a first exemplary embodiment of a dome-typed sine wave pattern of the illumination system shown in FIG. 1.
Figure 5:
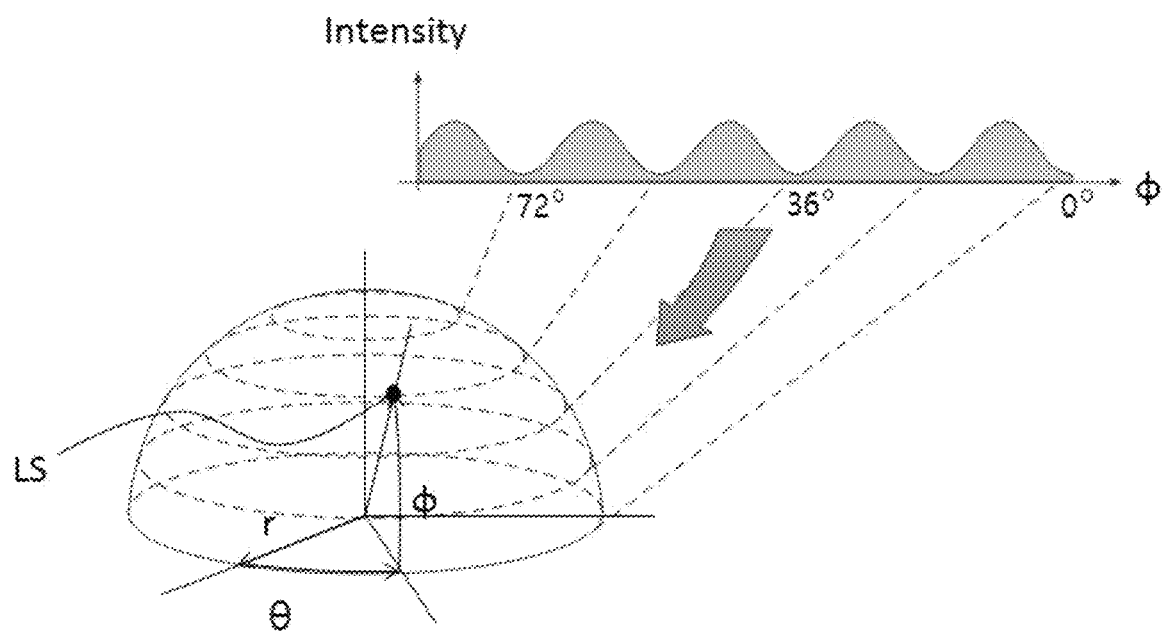
FIG. 5 is a conceptual view illustrating a second exemplary embodiment of a dome-typed sine wave pattern of the illumination system shown in FIG. 1.

FIG. 4 is a conceptual view illustrating a first exemplary embodiment of a dome-typed sine wave pattern of the illumination system shown in FIG. 1. FIG. 5 is a conceptual view illustrating a second exemplary embodiment of a dome-typed sine wave pattern of the illumination system shown in FIG. 1.

Referring to FIGS. 4 and 5, it is assumed that the plurality of light sources LS are arranged on a spherical coordinate system centering on a measurement position of the measurement target (for convenience, one light source is illustrated in FIGS. 4 and 5), and the light sources LS may be expressed as coordinates (r, θ, φ). Herein, when the dome shape has a hemispherical shape, the r-coordinates of the light sources LS are substantially all the same. In addition, in the spherical coordinate system, a plane in which the measurement stage 110 is present corresponds to a surface of φ=0, and a dome-shaped region in which the light sources LS are present is generally θ=0 to 360 degrees, and φ=0 to 90 degrees (or θ=0 to 180 degrees, φ=0 to 180 degrees).

In the first embodiment, the dome-shaped sine wave pattern may be formed such that a sine wave is formed on a hemisphere as a θ-coordinate changes from 0 to 360 degrees (or from −180 to 180 degrees) at a specific φ-coordinate within a range of 0 to 90 degrees and a constant r-coordinate. That is, as shown in FIG. 4, the dome-shaped sine wave pattern may be formed such that the valleys of the sine wave are located at the positions indicated by the dotted line. In this case, the dome-shaped sine wave pattern may form a pattern of watermelon stripes when viewed from the top. Alternatively, in the second embodiment, the dome-shaped sine wave pattern may be formed such that a sine wave is formed on a hemisphere as a φ-coordinate changes from 0 to 90 degrees at a specific θ-coordinate within a range of 0 to 360 degrees and a constant r-coordinate. That is, as shown in FIG. 5, the dome-shaped sine wave pattern may be formed such that the valleys of the sine wave are located at the positions indicated by the dotted line. In this case, the dome-shaped sine wave pattern may form a ring-shaped pattern of different radii when viewed from the top. In the intensity graph of FIG. 5, for convenience, φ-coordinates are expressed in reverse.

Figure 6:
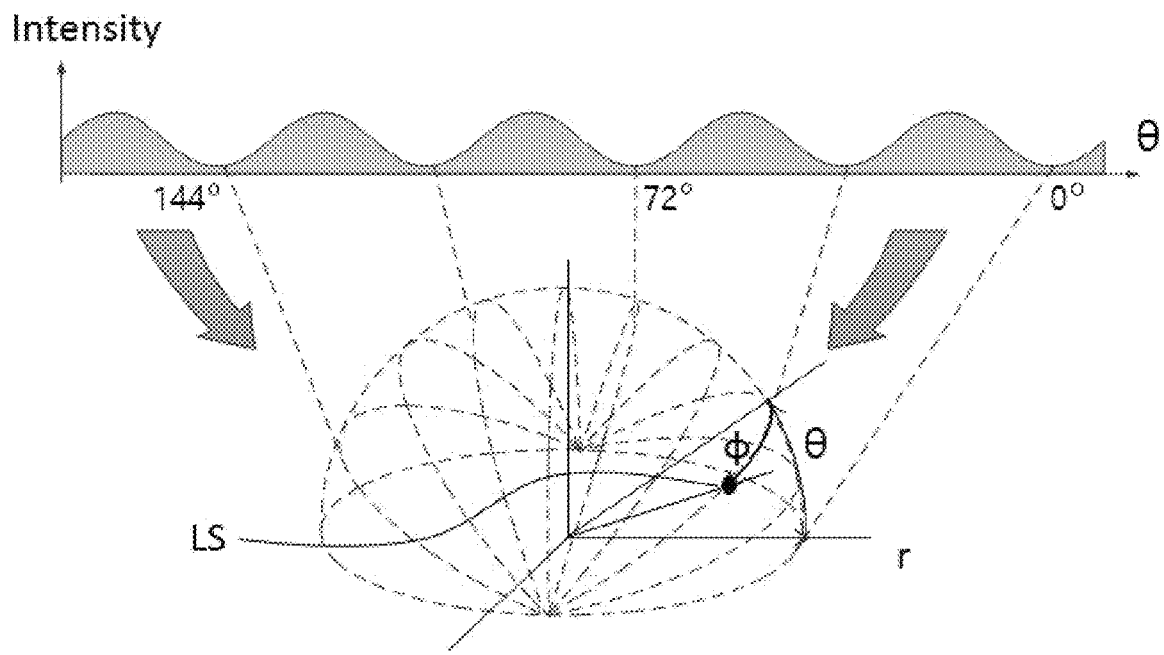
FIG. 6 is a conceptual view illustrating a third exemplary embodiment of a dome-typed sine wave pattern of the illumination system shown in FIG. 1.

FIG. 6 is a conceptual view illustrating a third exemplary embodiment of a dome-typed sine wave pattern of the illumination system shown in FIG. 1.

Referring to FIG. 6, unlike the spherical coordinate system of FIGS. 4 and 5, a plane in which the measurement stage 110 is present corresponds to a surface of θ=0, and a dome-shaped region in which the light sources LS are present is generally θ=0 to 180 degrees, and φ=−90 to 90 degrees.

In the third embodiment, the dome-shaped sine wave pattern is formed such that a sine wave is formed on a hemisphere as a θ-coordinate changes from 0 to 180 degrees at a specific φ-coordinate within a range of −90 to 90 degrees and a constant r-coordinate.

That is, as shown in FIG. 6, the dome-shaped sine wave pattern may be formed such that the valleys of the sine wave are located at the positions indicated by the dotted line (the dotted lines on the hemisphere correspond to the alternately located ridges and valleys). In this case, the dome-shaped sine wave pattern may form a pattern of watermelon stripes when viewed from the side. In the intensity graph of FIG. 6, for convenience, θ-coordinates are expressed in reverse.

The processing part 140 may generate data necessary for material determination from reflection lights RL by incident lights IL of a dome-shaped sine wave pattern generated by various methods as described above. The processing part 140 may acquire data necessary for the material determination by the following method for incident light according to the dome-shaped sine wave pattern.

First, the processing part 140 controls the light sources to be sequentially turned on by shifting the light sources N times according to a sine wave pattern with respect to a specific measurement position of the measurement target MT (N is a natural number of 2 or more). The light-providing part 120 generates N pattern lights that are sequentially turned on and irradiates the N pattern lights to the measurement target MT. The light-receiving part 130 N receives N reflection lights of the N pattern lights irradiated to the measurement target MT.

Then, the processing part 140 may calculate a phase at the specific measurement position of the measurement target MT, an average of the intensities of the N reflection lights RL, and a visibility of the N reflection lights RL, from the intensities of the N reflection lights RL.

For example, the phase, the average, and the visibility may be calculated by applying the following method.

Phase

The sine wave pattern is applied by N-shift, and a phase at a specific measurement position of the measurement target MT may be obtained from the information of the intensities of the reflection lights RL by the incident lights IL.

For example, in the case of applying a 4-bucket algorithm using N=4 shifts, a phase may be obtained as follows.

First, the intensity (I) of the reflection light RL received from the light-receiving part 130 by irradiating a sine wave to the measurement target MT is expressed as an equation dominated by moire interference patterns as shown in Equation 1.

$$I_p(x, y) = I_0(x, y)\{1 + \gamma(x, y)\cos[\phi(x, y) + \Delta]\} \quad \text{[Equation 1]}$$

In this equation, IP is an intensity of the reflection light RL, I0(x,y) is an average intensity, γ is a visibility, φ(x,y) is an initial phase to be measured, and Δ is a phase shift amount. Further, (x,y) represents a specific measurement position of the measurement target MT, and may be differently expressed according to a coordinate system indicating the specific measurement position.

In Equation 1, since the intensity of the reflection light RL is a function of an initial phase φ, the intensity of the reflection light RL may be measured to obtain the initial phase φ.

Specifically, by substituting 0, π/2, π, and 3π/2 radians for the phase shift amount (Δ) of Equation 1, respectively, I1, I2, I3, and I4 are obtained to be expressed by Equations 2 to 5 below.

$$I_1(x, y) = I_0(x, y)\{1 + \gamma(x, y)\cos[\phi(x, y)]\} \quad \text{[Equation 2]}$$

$$I_2(x, y) = I_0(x, y)\{1 + \gamma(x, y)\cos[\phi(x, y) + \frac{\pi}{2}]\} \quad \text{[Equation 3]}$$

$$I_3(x, y) = I_0(x, y)\{1 + \gamma(x, y)\cos[\phi(x, y) + \pi]\} \quad \text{[Equation 4]}$$

$$I_4(x, y) = I_0(x, y)\{1 + \gamma(x, y)\cos[\phi(x, y) + \frac{3\pi}{2}]\} \quad \text{[Equation 5]}$$

From Equations 2 to 5, Equation 6 below may be obtained.

$$\frac{I_4(x, y) - I_2(x, y)}{I_1(x, y) - I_3(x, y)} = \frac{\sin\{\phi(x, y)\}}{\cos\{\phi(x, y)\}} = \tan\{\phi(x, y)\} \quad \text{[Equation 6]}$$

Rewriting Equation 6, Equation 7 below may be obtained.

$$\phi(x, y) = \tan^{-1}\left[\frac{I_4(x, y) - I_2(x, y)}{I_1(x, y) - I_3(x, y)}\right] \quad \text{[Equation 7]}$$

The obtained initial phase (φ) will be referred to as a phase, and the phase may represent a slope at a specific position (x,y) of the surface of the measurement target MT. The method of obtaining the phase is similar to the conventional deflectometry method, but a sine wave pattern formed in the conventional planar shape is irradiated from the plane, so that the phase does not represent a slope. In contrast, the dome-shaped sine wave pattern of the present invention is irradiated on a curved surface, so the phase may represent a slope.

When the light-receiving part 130 is positioned substantially vertically upward as shown in FIG. 1, a surface inclined at a specific position of the measurement target MT should be within a range of at least about −45° to 45° so that measurement of the light-receiving part 130 is available. Thus, a range of a measurable slope is about −45° to 45°.

Depending on a geometric placement relationship between a position of the measurement stage 110, a position of the surface of the measurement target MT spaced apart from the measurement stage 110, and the light sources disposed at the bottom among the light sources LS, etc., the range of the slope may vary somewhat, but it is negligible or simply correctable.

Average

For example, in the case of applying a 4-bucket algorithm using N=4 shifts, an average may be obtained as follows.

Equation 8 may be obtained simply by arithmetic average of I1 to I4 obtained in Equations 2 to 5.

$$A(x, y) = \frac{I_1 + I_2 + I_3 + I_4}{4} \quad \text{[Equation 8]}$$

In this equation, Ai(x,y) means an average of four intensity data measured at a specific measurement position (x,y) of the measurement target MT.

Visibility

A visibility means a ratio of an amplitude (Bi(x,y)) to an average (Ai(x,y)).

For example, in the case of applying a 4-bucket algorithm using N=4 shifts, a visibility may be obtained as follows.

$$V(x, y) = \frac{B(x, y)}{A(x, y)} = \frac{\sqrt{2(I_1 - I_3)^2 + (I_2 - I_4)^2}}{I_1 + I_2 + I_3 + I_4} \quad \text{[Equation 9]}$$

In this equation, Vi(x,y) is a visibility of four intensity data measured at a specific measurement position (x,y) of the measurement target MT, and Bi(x,y) and Ai(x,y) represent an amplitude and an average of the four intensity data, respectively.

As described above, methods of obtaining a phase, an average, and a visibility are similar to the conventional deflectometry method. However, the conventional deflectometry method has been used for grasping conditions of a surface of a measurement target, that is, a slope of the surface, a shape of the surface, a scratch of the surface, etc., but has not been used for material determination as in the present invention. This is because a conventional illumination device has implemented a sine wave pattern light formed in a planar shape by using a display device such as an LCD monitor or a grid transfer device, which does not completely or adequately cover an upper portion and covers a very limited range flatly. As described above, according to the conventional deflectometry method of irradiating planar sine wave pattern light in a limited range, only for light irradiated at a specific angle to the measurement target at a specific position where a pattern light source is disposed, reflection light reflected at a specific angle to the measurement target at a specific position where a camera is disposed is received. Therefore, it is possible to measure a height of any one position by measuring a phase of the position with an image measured at the position, but since the difference in brightness between the images measured at multiple positions may occur, the relative relationship between measurement positions is not correct.

However, in the light-providing part 120 of the present embodiment, the plurality of light sources LS are arranged to surround the top of the measurement target MT in a dome shape, and are connected in series with each other, so that individual lighting control may be possible. Thus, the incident lights IL from a much wider range of directions (almost total upward directions) to the measurement target MT irradiate a sine wave pattern toward the measurement target MT at substantially the same distance (radius of the hemisphere), and the reflection lights RL are received in the light-receiving part 130 located at on substantially the same distance. Accordingly, since the absolute intensity of the reflection light at a specific measurement position may be obtained very accurately, and the relative relationship between multiple measurement positions, a reflectance for each measurement position, etc., which requires a relative relationship for each measurement position, may be measured very accurately.

Figure 7:
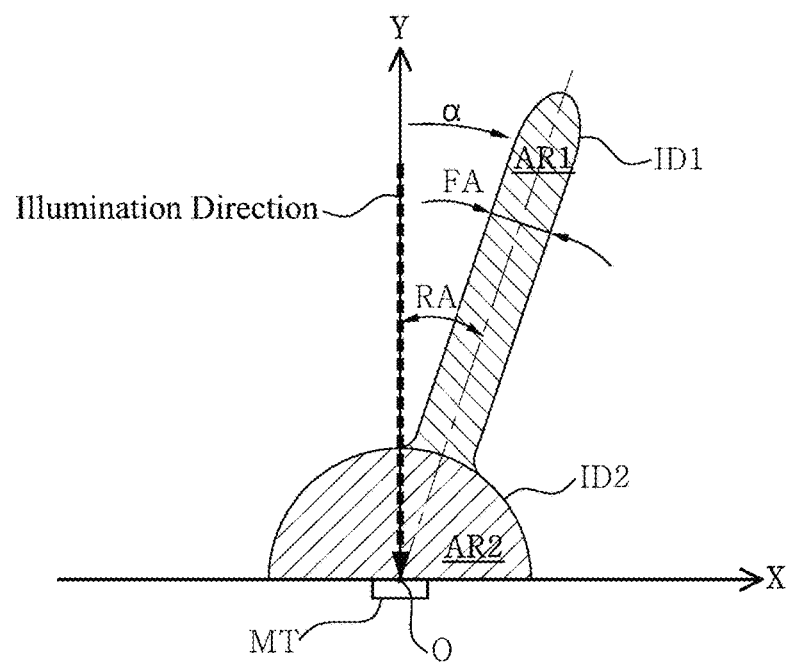
FIG. 7 is a graph for explaining a method of determining material of a measurement target according to an exemplary embodiment of the present invention.

FIG. 7 is a graph for explaining a method of determining material of a measurement target according to an exemplary embodiment of the present invention. The graph in FIG. 7 shows an intensity distribution of reflection lights of an object having arbitrary material, and shows an example of the case where light is irradiated from above vertically.

Referring to FIG. 7, after measuring a multi-directional intensity distribution of reflection lights for an object having any material, the multi-directional intensity distribution of the reflection lights may be expressed by a first intensity distribution ID1 of specular reflection lights and a second intensity distribution ID2 of diffuse reflection lights. The reflection angle RA of the first intensity distribution ID1 is a parameter representing an angle at which a symmetrical axis of the first intensity distribution ID1 is inclined with respect to substantially vertical upward direction, which corresponds to a phase obtained by the measurement.

In addition, the total area (AR=AR1+AR2) of the first intensity distribution ID1 and the second intensity distribution ID2 is a parameter representing the total area occupied by the first intensity distribution ID1 and the second intensity distribution ID2, which corresponds to an average of the intensities of the reflection lights RL obtained by the measurement as a total reflectance.

In addition, the spreading angle FA of the first intensity distribution ID1 is a parameter representing a width of the elongated nipple shape (see FIG. 2), which corresponds to a visibility of the measurement object MT obtained by the measurement as a roughness or glittering degree thereof.

Since the parameters have different tendencies depending on the material of the object, it may be possible to determine the material of the measurement object MT based on at least one of the parameters.

For example, in case that the total reflectance of the measurement target MT obtained from the total area of the first intensity distribution ID1 and the second intensity distribution ID2 is about 40% or more, and a diffuse reflectance of the measurement target MT is below a reference value since the area AR2 of the second intensity distribution ID2 is very small, the measurement target MT may be determined as metal material.

As another example, the diffuse reflectance of the measurement target MT obtained from the area AR2 of the second intensity distribution ID2 is about 40% or more, and the spreading angle FA of the first intensity distribution ID1 indicating a glittering degree of the measurement target MT is about 40° or more, and the total reflectance of the measurement target MT obtained from the total area of the first intensity distribution ID1 and the second intensity distribution ID2 is about 50% or more, the measurement target MT may be determined as paper material.

For the material determination as described above, after obtaining reference data in advance through experiments on various materials, a measurement target to be actually desired to determine material may be measured, and the measured data may be compared with the reference data, thereby judging material thereof.

In the present invention, since the phase, average, and visibility of the measurement target MT obtained above correspond to each parameter as described above, when obtaining the phase, average, and visibility, material determination may be possible without directly obtaining ID1 and the second intensity distribution ID2.

In one embodiment, the processing part 140 may utilize phase, average, and visibility obtained for each measurement position in a predetermined measurement area of the measurement target MT, and thus generate image data as data having optical meaning for the measurement area. The generated image data may be used as a tool for users to directly determine material thereof after reviewing the image data.

First, the phase is information representing a slope of a surface of the measurement target MT, and a slope image in which a slope for each pixel is shown in gray scale for the measurement target MT may be provided. That is, a phase measurable at each pixel is represented by a minimum of 0 and a maximum of 255 to generate a slop image having a range of 0 to 255 for the measurement area. For example, when the minimum slope and the maximum slope are −45° and 45°, respectively, −45° may be represented by 0 and 45° by 255, respectively, and a gray scale on a horizontally formed surface with a slope of 0 is 127. The coordinates for any position of the surface of the measurement target MT may be represented by a Cartesian coordinate system or a polar coordinate system. A slope may be obtained for each coordinate component according to the coordinate system (x, y of the Cartesian coordinate system or r, θ of the polar coordinate system), and an image for each coordinate component may be represented or an image by combining coordinate components may be represented.

Next, the average is information representing reflectance characteristics of the measurement target MT, and a reflectance image in which a reflectance for each pixel is shown in gray scale for the measurement target MT may be provided. Since the image is an averaged image of various reflection lights according to the movement of the pattern, the image corresponds to an image photographed under illumination uniformly irradiating light from all upward directions. Thus, the image represents a reflectance representing average brightness for various surface conditions. That is, a reflectance image having a range of 0 to 255 for a measurement area may be generated by representing an average measured at each pixel with a minimum of 0 and a maximum of 255.

In addition, the visibility is information representing glitter or roughness characteristics of the measurement target MT, and a glitter image or a roughness image in which glitter or roughness for each pixel is shown in gray scale for the measurement target MT may be provided. The visibility indicates a degree of change in the brightness reflected for the irradiated sine wave pattern, and as the glittering surface reflects the formed pattern as it is, the visibility of the measurement target MT increases. Thus, glittering of the surface of the measurement target MT is generally proportional to the visibility, and roughness of the surface of the measurement target MT is generally inversely proportional to the visibility. Accordingly, the glitter image or the roughness image may be generated to have a range of 0 to 255 for the measurement area by representing the visibility or the inverse number thereof measured at each pixel with a minimum of 0 and a maximum of 255.

Therefore, based on the phase, average, and visibility obtained for each measurement position in a predetermined measurement area of the measurement target MT, the processing part 140 may generate a slope image, an average image, a glitter (or roughness) image, and a processed or combined image (hereinafter referred to as "slope images, etc.") for the measurement area of the measurement target MT.

Users may directly determine the material using the slope image, etc. generated as described above. The material determination may be performed by determining the type of material, such as whether the surface of the measurement target MT is metal or dielectric, etc. using the slope image, etc. For example, in the case that the measurement target MT is any one of copper, SUS, aluminum and silver, the material may be determined as silver when the brightness shown in the reflectance image is very bright and shown in gray scale of 250, and the material may be determined as copper when the brightness shown in the reflectance image is shown in gray scale of 128.

In addition, further from the material determination, the surface condition of the measurement target MT may also be determined. The slope image, etc. may be used to determine whether the measurement target MT has scratches, imprints, or processing patterns.

Meanwhile, since the material or surface condition of the measurement target MT from the slope image, etc., may appear in different aspects depending on the color of the illumination, the color of the pattern illumination irradiated to obtain the slope image, etc. may be used in various colors in addition to a white color.

For example, for green pattern lighting, in case that the reflectance is about 50% (about 127 in gray scale), the glitter is about 90% or higher (about 230 or higher in gray scale), and the slope has a slope distribution of a spherical surface through the image, this object is determined as a concave polished copper, i.e., in which both the condition and the material of the surface may be recognized.

On the other hand, in addition to determining condition and material of a surface, in order for determining defects, it may be also possible to generate a necessary processed image by exaggerating the phase, average, visibility, or image related thereto.

In another embodiment, instead of generating an image for use as a tool for users to directly determine the material, the processing part 140 may directly determine the material of the measurement target MT based on the phase, average and visibility obtained for each measurement position in the measurement area of the measurement target MT. In this case, the criteria for determining various materials described above, or criteria for determining various surface conditions, etc. may be set as reference data in advance, and then the processing part 140 may directly determine material or surface condition based on the reference data.

According to the illumination system of the present invention, incident lights are irradiated from multiple directions to the measurement target using a plurality of light sources and controlled to be turned on/off according to a dome-shaped sine wave pattern formed on a dome, to thereby calculate a phase at the specific measurement position of the measurement target, an average of the intensities of reflection lights, and a visibility of reflection lights, so that the material of the measurement target may be easily determined.

In addition, unlike a conventional planar sine wave pattern, since the dome-shaped sine wave pattern is formed on a dome-shaped hemisphere, in case of the phase, the average, and the visibility, not only a measurement value at any one measurement position is very accurate, but also an absolute measurement value at each measurement position is very accurate, so the relationship between the measurement positions may also have a very accurate value.

Accordingly, when the phase, the average, and the visibility calculated as described above are represented or processed as an image for material determination, users may easily utilize the image for material determination.

In addition, even if the intensity distribution of the reflection lights is not necessarily obtained for the material determination, the material determination may be possible based only on the information of the phase, the average, and the visibility.

Also, surface condition determination of an object may be available by the illumination system, and the illumination system may be utilized for defect determination of an object, in addition to the material determination as described above.

In addition, the phase, the average, and the visibility calculated as described above, when setting various criteria for material determination, surface condition determination, defect determination, etc. in advance, the processing part may perform material determination, surface condition determination, and defect determination. Thus, users' convenience and reliability may be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:
1. An illumination system comprising:
a measurement stage on which a measurement target is located;
a light-providing part including a plurality of light sources irradiating incident lights to the measurement target, wherein the plurality of light sources are arranged to surround a top of the measurement target in a dome shape so that the incident lights from multiple directions with respect to the measurement target are selectively illuminated toward the measurement target;
a light-receiving part acquiring reflection lights by the measurement target according to the incident lights irradiated by the light-providing part; and
a processing part controlling the light sources to be turned on/off according to a dome-shaped sine wave pattern;
wherein the processing part controls the light sources to be sequentially turned on/off by shifting N times according to the dome-shaped sine wave pattern for a specific measurement position of the measurement target (wherein N is a natural number of 2 or more), the light-providing part generates N pattern lights that are sequentially turned on/off and irradiates the N pattern lights toward the measurement target, the light-receiving part receives N reflection lights of the N pattern lights irradiated to the measurement target, and the processing part calculates a phase at the specific measurement position of the measurement target, an average of the intensities of the N reflection lights, and a visibility of the N reflection lights, from the intensities of the N reflection lights.

2. The illumination system of claim 1, wherein the processing part generates image data for a measurement area based on the calculated phase, average and visibility.

3. The illumination system of claim 1, wherein the image data includes a slope image representing a slope for each pixel of the measurement target on a gray scale based on the calculated phase, a reflectance image representing a reflectance for each pixel of the measurement target on a gray scale based on the calculated average, and a roughness image representing a roughness for each pixel of the measurement target by a gray scale based on the calculated visibility.

4. The illumination system of claim 1, wherein the processing part determines material of the measurement target from the calculated phase, average and visibility.

5. The illumination system of claim 1, wherein each of the light sources of the light-providing part includes a light-emitting diode (LED).

6. The illumination system of claim 5, wherein the light-providing part further includes an illumination cover disposed over the measurement target to cover surrounding of the measurement target, and light-emitting diodes of the light sources are installed on the illumination cover.

7. The illumination system of claim 6, wherein the illumination cover has a shape including at least a portion of a dome, and the light-emitting diodes are provided in a ring shape having different diameters when viewed from a bottom direction to form a plurality of rows within a shape including at least a portion of the dome.

8. The illumination system of claim 6, wherein the illumination cover has an opening formed corresponding to an upper portion of the measurement target, and the light-receiving part is arranged to receive reflection lights reflected from the measurement target through the opening.

9. The illumination system of claim 8, wherein the light-providing part includes:

a first light-providing part that provides incident light to the measurement target from the light-emitting diodes mounted on the illumination cover; and a second light-providing part that provides incident light to the measurement target through the opening formed through the illumination cover.

10. The illumination system of claim 1, wherein when the plurality of light sources are arranged at $(r, \theta, \varphi)$ coordinates on a spherical coordinate system centering on the measurement position of the measurement target, the dome-shaped sine wave pattern is formed such that a sine wave is formed on a hemisphere as a $\theta$-coordinate changes from 0 to 360 degrees at a specific $\varphi$-coordinate within a range of 0 to 90 degrees and a constant r-coordinate.

11. The illumination system of claim 1, wherein when the plurality of light sources are arranged at $(r, \theta, \varphi)$ coordinates on a spherical coordinate system centering on the measurement position of the measurement target, the dome-shaped sine wave pattern is formed such that a sine wave is formed on a hemisphere as a $\varphi$-coordinate changes from 0 to 90 degrees at a specific $\theta$-coordinate within a range of 0 to 360 degrees and a constant r-coordinate.

12. The illumination system of claim 1, wherein when the plurality of light sources are arranged at $(r, \theta, \varphi)$ coordinates on a spherical coordinate system centering on the measurement position of the measurement target, is the dome-shaped sine wave pattern is formed such that a sine wave is formed on a hemisphere as a $\theta$-coordinate changes from 0 to 180 degrees at a specific $\varphi$-coordinate within a range of −90 to 90 degrees and a constant r-coordinate.

\* \* \* \* \*